US009418799B2

(12) United States Patent
Kim et al.

(10) Patent No.: US 9,418,799 B2
(45) Date of Patent: Aug. 16, 2016

(54) KEY BUTTON ASSEMBLY FOR ELECTRONIC DEVICE AND OPERATING METHOD THEREOF

(71) Applicant: Samsung Electronics Co., Ltd., Gyeonggi-do (KR)

(72) Inventors: Ho-Jun Kim, Gyeonggi-do (KR); Jung-Hoon Park, Incheon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 125 days.

(21) Appl. No.: 14/104,229

(22) Filed: Dec. 12, 2013

(65) Prior Publication Data

US 2014/0251776 A1 Sep. 11, 2014

(30) Foreign Application Priority Data

Mar. 8, 2013 (KR) ........................ 10-2013-0025237

(51) Int. Cl.
*G06F 3/041* (2006.01)
*H01H 13/66* (2006.01)
*H01H 13/702* (2006.01)
*H01H 3/02* (2006.01)

(52) U.S. Cl.
CPC ............ *H01H 13/66* (2013.01); *H01H 13/702* (2013.01); *H01H 2003/0293* (2013.01); *H01H 2231/022* (2013.01); *H01H 2239/006* (2013.01); *H01H 2239/074* (2013.01)

(58) Field of Classification Search
CPC .......... G06F 3/041; G06F 3/016; G06F 3/044
USPC .................................................. 200/406, 600
See application file for complete search history.

(56) References Cited

U.S. PATENT DOCUMENTS

2006/0187210 A1* 8/2006 Griffin et al. ................. 345/168
2013/0076649 A1* 3/2013 Myers et al. .................. 345/173

FOREIGN PATENT DOCUMENTS

KR 10-2008-0064260 A 7/2008
KR 10-2009-0049863 A 5/2009
KR 10-2011-0093277 A 8/2011
KR 10-2013-0037909 A 4/2013

* cited by examiner

*Primary Examiner* — Renee S Luebke
*Assistant Examiner* — Ahmed Saeed
(74) *Attorney, Agent, or Firm* — Cha & Reiter, LLC

(57) ABSTRACT

An electronic device includes a substrate having a key sensor region and a touch sensor regions, a dome key unit, a key button, and a touch sensor. The dome key unit is arranged on the key sensor region of the substrate. The key button is arranged above the dome key unit in alignment with the dome key unit. The touch sensor is arranged on the touch sensor region of the substrate. The touch sensor is arranged such that it includes a region overlapping with a part of the key button. The key button can perform at least two functions associated with different input schemes at the same input point of the key button by means of the dome key unit and the touch sensor.

14 Claims, 3 Drawing Sheets

KEY BUTTON ASSEMBLY FOR ELECTRONIC DEVICE AND OPERATING METHOD THEREOF

CLAIM OF PRIORITY

This application claims priority under 35 U.S.C. §119(a) to a Korean Patent Application filed in the Korean Intellectual Property Office on Mar. 8, 2013 and assigned Serial No. 10-2013-0025237, the contents of which are herein incorporated by reference in its entirety.

BACKGROUND

1. Technical Field

The present disclosure relates to a key button assembly for an electronic device and an operating method thereof.

2. Description of the Related Art

In recent years, the growth of electronic devices came to be applied to various fields used in daily life. Particularly, among these electronic devices, mobile terminals are becoming devices that are most essential to our daily life. Because the mobile terminals are rapidly improving processing speeds, and it is common for electronic devices such as a smart phone to increasingly have various supplementary functions such as web surfing and the like, it is becoming very common for every person to possess at least one mobile terminal.

Electronic devices are put on the market in various sizes according to their functions and users' preference. So, attention is paid to not only the functions and slimming of the electronic devices but also the exterior appearance and esthetics thereof. Although the electronic devices have the almost same functions as devices of other enterprises, among the electronic devices, those which provide the maximum convenience and functionality for the user are gaining supremacy over the market.

Active research is being conducted on an input means having a data input function which is a part of these functions provided for the user. Terminal manufacturers are racing to provide a more efficient data input method.

SUMMARY

An aspect of the present invention is to substantially solve at least the above problems and/or disadvantages and to provide at least the advantages described below. Accordingly, one aspect of the present invention is to provide a key button assembly for an electronic device designed and implemented to improve operation reliability by realizing a metal dome scheme and a touch scheme together, simultaneously in one substrate, and an operating method thereof.

Another aspect of the present invention is to provide a key button assembly for an electronic device realized to enable one key button assembly to perform at least two functions, thereby promoting the reduction of a manufacturing cost by key button exclusion, and an operating method thereof.

A further aspect of the present invention is to provide a key button assembly for an electronic device constructed to enable one key button assembly to perform at least two functions, thereby excluding, if possible, a key button and making contribution to the slimming of the electronic device, and an operating method thereof.

Yet another aspect of the present invention is to provide a key button assembly for an electronic device realized to exclude a separate power on/off button, thereby contributing to securing a design space of the electronic device, and an operating method thereof.

The above aspects are achieved by providing a key button assembly for an electronic device and an operating method thereof.

According to one aspect of the present invention, an electronic device includes a substrate having a key sensor region and a plurality of touch sensor regions, a dome key unit, a key button, and a touch sensor. The dome key unit is arranged on the substrate in electrical contact with the key sensor region. The key button is arranged above the dome key unit in alignment with the dome key unit. The touch sensor is arranged on the same layer as the dome key unit of the substrate the touch sensor in electrical contact with one of the plurality of touch sensor regions and being arranged in alignment with a region overlapping with a part of the key button. The key button can perform at least two functions associated with different input schemes at the same input point by means of the dome key unit and the touch sensor.

The dome key unit may include a 1st contact point, a 2nd contact point, and a metal dome. The 1st contact point is arranged in a dome key unit installation region of the substrate. The 2nd contact point is arranged to be spaced apart and electrically insulated from the 1st contact point. The metal dome is installed to electrically connect with the 2nd contact point, and electrically connects the 2nd contact point with the 1st contact point by actuation of the key button.

The key button may be installed in such a manner that a part of the key button is exposed to an exterior surface of a case frame of the electronic device. The case frame may be installed such that an inner surface of the case frame is in electrical contact with a plurality of touch sensor installation regions of the substrate.

The case frame may be formed of glass material, and the case frame may be installed such that an inner surface of the case frame is in electrical contact with at least one of the plurality of touch sensor installation regions of the substrate. At this time, the case frame may be a touch sensitive surface extending from a display of the electronic device. But, this does not intend to limit the scope and spirit of the present invention, and the case frame may be formed the known synthetic resin materials.

A resilient contact pad may be interposed between the key button and the metal dome, for transmitting smooth pressurization and restoration force on the metal dome. The contact pad may be formed of conductive rubber or conductive silicon materials. At this time, the contact pad is installed such that a bottom surface of the contact pad gets in contact with a touch sensor installation region of the substrate.

According to another aspect of the present invention, an operating method of an electronic device for selectively driving a dome key unit sensor and a touch sensor installed in a substrate by one key button is provided. The method includes executing a 1st function by pressurizing the key button and activating the dome key unit, and executing a 2nd function by touching the key button and activating the touch sensor. The 1st function is executed on a preferential basis.

The 1st function may be a power on/off function of the electronic device or a sleep mode or wake-up mode conversion function of the electronic device. At this time, when the dome key unit is pressurized longer than a predetermined time by pressurization of the key button, the power on/off function of the electronic device is activated. Also, when the dome key unit is pressurized shorter than a predetermined time, the sleep mode or wake-up mode conversion function of the electronic device is activated.

The 2nd function may be a home button function for restoring a currently displayed screen of the electronic device to a home screen.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

Preferred embodiments of the present invention will be described herein below with reference to the accompanying drawings to assist in a comprehensive understanding of exemplary embodiments of the invention as defined by the claims and their equivalents. In the following description, well-known functions or constructions are not described in detail since they would obscure appreciation of the present invention by a person of ordinary skill in the art with unnecessary detail of the well-known functions and structures. Also, the terms used herein are defined according to the functions of the present invention as would be understood by a person of ordinary skill in the art. Thus, the terms may vary depending on user's or operator's intension and usage. That is, the terms used herein must be understood based on the descriptions made herein in view of the ordinary level of skill in the art. Although various specific details are included to help understanding of the present invention, they are regarded only as exemplary. Thus, those skilled in the art can variously change and modify the embodiments described herein without departing from the scope of the present invention.

In the following description, a mobile terminal is illustrated as an electronic device, and a key button assembly applied to the mobile terminal is described. But, this does not intend to limit the scope and spirit of the present invention, and can be applied to various devices. For example, this can be applied to a portable electronic device and a device such as a portable terminal, a mobile pad, a media player, a tablet computer, a handheld computer, or a Personal Digital Assistant (PDA). This can be applied even to various fixed electronic devices such as Personal Computers (PCs) and the like which are not the portable electronic devices.

Figure 1:
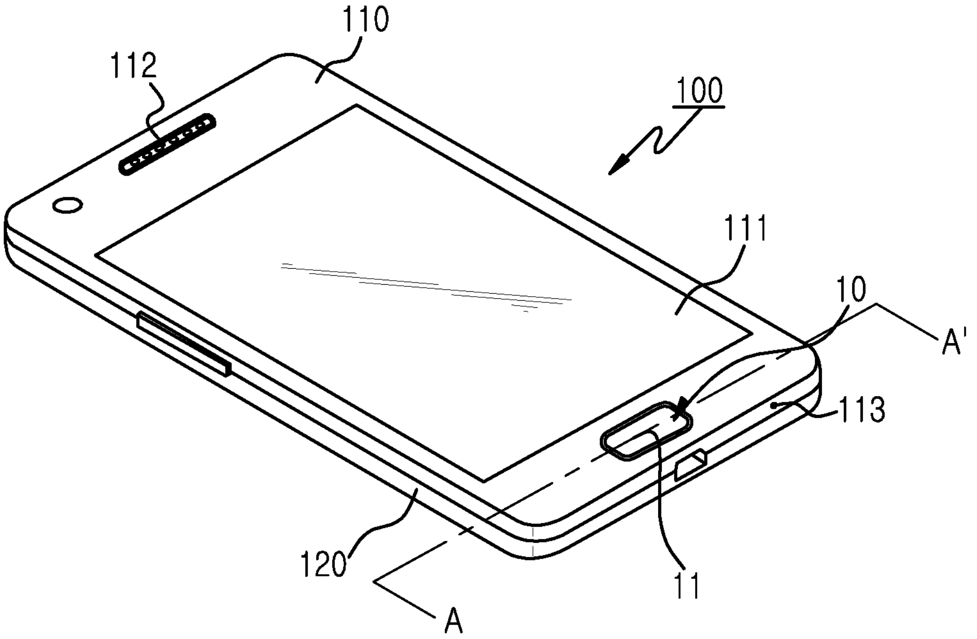
FIG. 1 is a perspective view illustrating an electronic device in which a key button assembly according to an exemplary embodiment of the present invention is installed.

FIG. 1 is a perspective view illustrating an electronic device in which a key button assembly 10 according to an exemplary embodiment of the present invention is installed.

Referring to FIG. 1, the electronic device 100 has a display 111 which is installed in front thereof. Desirably, the display 111 is a touch sensitive screen (or a near touch sensitive) capable of concurrently performing data input/output. A speaker 112 is installed above the display 111 and receives and outputs a counterpart's voice or other sounds, and a microphone 113 is installed below the display 111 and transmits a voice of a user who uses the electronic device 100 to a counterpart electronic device.

Also, the key button assembly 10 according to the present invention is installed in front of the electronic device 100. This key button assembly 10 can be used as a home key. Accordingly, the present invention does not require a separate power button, and a user can power on/off the electronic device 100 by pressurizing the key button assembly 10 to activate a metal dome.

For example, the user can power on/off the electronic device 100 by holding a pressurized state of the key button assembly 10 of the electronic device 100 during a predetermined time using a metal dome function of the key button assembly 10. Also, the user can make the electronic device 100 enter a sleep mode or convert the sleep mode into a wake-up mode by pressurizing the key button assembly 10 of the electronic device 100 during a short predetermined time.

Also, a screen mode currently activated using a touch function of the key button assembly 10 can perform a home button function of moving to a home screen.

For example, the power on/off function, the sleep mode and wake-up mode conversion function, the home button function and the like are all enabled by touching the same position of the key button assembly 10, but the touch function and the metal dome function cannot be misused or erroneously used by the user, because the touch function is enabled at a time a user touches and releases (i.e., tap motion) a corresponding key button region and the metal dome function is enabled at a time the user pressurizes and holds the key button to activate the metal dome. Accordingly, the key button assembly 10 according to the present invention should be desirably controlled to accept the metal dome function preceding the touch function so that the touch function is not incorrectly recognized when a user intends to actuate a metal dome function.

The key button assembly 10 according to the present invention performs the power on/off function, the sleep mode or wake-up mode conversion function, and the home button function in the electronic device 100 and, however, it does not matter that the key button assembly 10 according to the present invention uses a combination of other different functions executable in other electronic devices.

Figure 2:
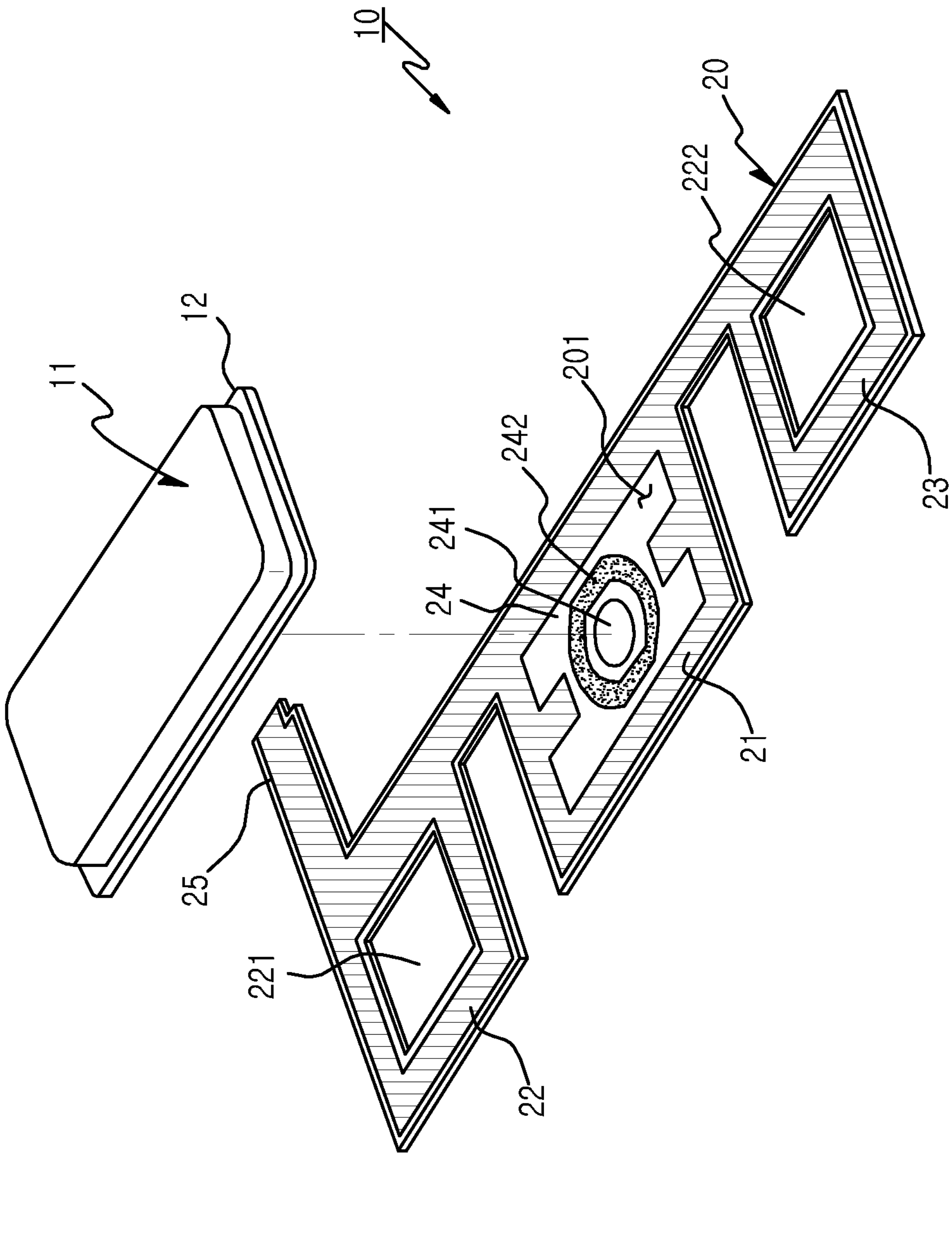
FIG. 2 is an explosive perspective view illustrating the key button assembly of FIG. 1 according to an exemplary embodiment of the present invention.
Figure 3:
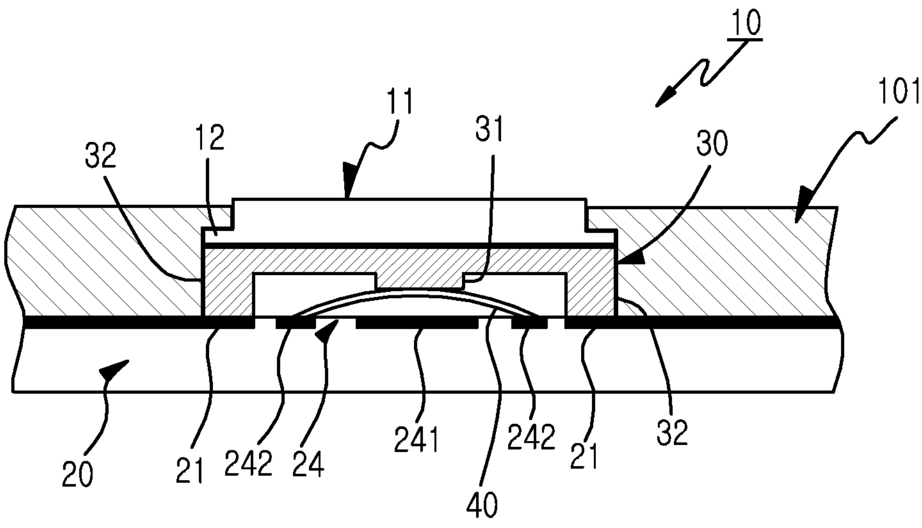
FIG. 3 is a cross section illustrating key parts of an electronic device of a state in which the key button assembly of FIG. 1 according to an exemplary embodiment of the present invention is installed.

FIG. 2 is an exploded perspective view illustrating the key button assembly of FIG. 1 according to an exemplary embodiment of the present invention, and FIG. 3 is a cross section along section line A-A' of FIG. 1, illustrating key parts of an electronic device of a state where the key button assembly of FIG. 1 according to an exemplary embodiment of the present invention is installed.

Referring to FIGS. 2 and 3, the key button assembly 10 according to the present invention includes a substrate 20, a dome key unit 24, and a 1st touch sensor (region) 21. The substrate 20 is of a predetermined shape. The dome key unit 24 is arranged in a metal dome installation region 201 of the substrate 20, and the 1st touch sensor (region) 21 is arranged around the metal dome installation region 201 where the dome key unit 24 is arranged. The present invention realizes the key button assembly 10 in the substrate (e.g., Printed Circuit Board (PCB)) 20. However, this does not intend to limit the scope and spirit of the present invention and it does not matter that it is applied to a Flexible Printed Circuit (FPC) as other types of assemblies and circuit boards may be implemented within the scope of the invention as would be apparent to one skilled in the art . . . .

The dome key unit 24 includes a 1st contact point 241, a 2nd contact point 242, a dome-shaped metal dome (40 of FIG. 3), a contact pad 30, and a key button 11. The 1st contact point 241 is arranged on the substrate 20. The 2nd contact point 242 is arranged to be electrically spaced apart from the 1st contact point 241. The metal dome 40 is electrically connected with the 1st contact point 241 and the 2nd contact point 242, and is attached to the substrate 20. The contact pad 30 pressurizes a top of the metal dome 40. The key button 11 is attached to a top of the contact pad 30, and is constructed to pass through a case frame 101 of the electronic device 100 and be exposed to the outside.

As illustrated, desirably, the 1st contact point 241 is installed to be spaced apart from within the 2nd contact point 242 of a hollow circular shape. When the metal dome 40 is pressurized at its center by a pressurization protrusion 31 of the contact pad 30 in electrical connection with the 2nd contact point 242, the metal dome 40 is electrically connected at its center with the 1st contact point 241, for performing a switching operation. More desirably, the metal dome 40 can be electrically connected with the 1st contact point 241 in a state in which an edge of the metal dome 40 is simultaneously attached to the 2nd contact point 242.

In the drawings, the key button assembly 10 is partially illustrated, and a 2nd touch sensor region 22 and a 3rd touch sensor region 23 for separate touch motions are extended and formed at both ends of the key button assembly 10. In detail, the 1st touch sensor region 21 arranged on the substrate 20 for the key button assembly 10 and the 2nd touch sensor region 22 and the 3rd touch sensor region 23 arranged at both ends of the 1st touch sensor region 21 are assembled in a state of being electrically connected with one another. Accordingly, the touch sensor regions 21, 22, and 23 each can be commonly electrically connected to a connection terminal 25 extended and formed at one side of the substrate 20. If the substrate 20 is coupled to the inside of the electronic device 100, the connection terminal 25 of the substrate 20 may be electrically connected with a mainboard (not shown) of the electronic device 100.

The case frame 101 can be formed of Polyethylene Terephthalate (PET) or glass including Indium Tin Oxide (ITO) which is applied to touch sensors (for example, capacitive touch sensors) provided in the touch sensor regions 21, 22, and 23. But, this does not intend to limit the scope and spirit of the present invention, and a known touch sensor using metal materials in a touch pad may also be used in the touch pad assembly of the present invention. Furthermore, the 2nd touch sensor region 22 and the 3rd touch sensor region 23 can have openings 221 and 222, respectively. The openings 221 and 222 enable light, which is irradiated from light emitting means arranged at the lower sides of the 2nd touch sensor region 22 and the 3rd touch sensor region 23, to pass up to the case frame 101 through opening 221 and 222.

The mounting relationship of the components of the key button assembly 10 is described below.

First, the metal dome 40 is attached onto the metal dome installation region 201 of the substrate 20. In detail, the metal dome 40 is attached such that its edge is electrically connected to the 2nd contact point 242, the 1st contact point 241 is arranged to be spaced apart from the 2nd contact point 242 within an internal space of the 2nd contact point 242 is kept to be spaced apart from the metal dome 40. Next, the 1st touch sensor region 21 is arranged to be in contact with the metal dome installation region 201 of the substrate 20. Together with a circuit pattern of the metal dome 40, the 1st touch sensor region 21 is extended in the direction of the connection terminal 25 of the substrate 20.

Additionally, the contact pad 30 is installed above the metal dome 40. The contact pad 30 includes the pressurization protrusion 31 and a skirt 32. The pressurization protrusion 31 is protruded and formed at the lower side and middle of the contact pad 30, and pressurizes the top of the metal dome 40. The skirt 32 is extended below the contact pad 30 along an outer edge of the contact pad 30. By this, the contact pad 30 provides a restoration force to the metal dome 40 and again restore the metal dome 40 to the original position when the key button 11 attached to the top of the contact pad 30 is depressed. For example, when key button 11 is pressed, metal dome 40 becomes flattened and thus the edges of the metal dome 40 are spread out and come into contact with the skirt 32. When the metal dome 40 is flattened into a spread out position, it bears against the walls of skirt 32 which thereby exert a force on the metal dome 40 to push it into its original position. Desirably, the contact pad 30 is formed of conductive rubber or conductive silicon materials.

The key button 11 is attached to a top of the contact pad 30. The key button 11 is installed such that an edge 12 of the key button 11 is caught by an inner surface of the case frame 101 of the electronic device 100 to retain the key button within the electronic device 100 and to prevent the separation of the key button 11. The s key button is thus partially exposed to the outside of the electronic device 100 as the top surface of the key button 11 that extends above the edge 12 extends slightly above the surface of the case frame 101.

The contact pad 30 may be formed of conductive materials, and be placed in electrical contact with the 1st touch sensor region 21. The contact pad 30 may be installed such that inner surfaces of the case frame 101 other than a key button installation region come in electrical contact with the 1st touch sensor region 21 of the substrate 20.

This construction is helpful for the touch sensor to perform smooth sensing operation when the user touches the key button 11 or a peripheral region thereof. Here, the peripheral region is a region other than the region in which the key button 11 is installed to be exposed to the case frame 101 of the electronic device 100, and represents a region in which the touch sensor regions 21, 22, and 23 arranged on the substrate 20 and the inner surface of the case frame 101 get in contact with one another. This region may be part of the case frame that surrounds the key button 11 and extends to the edges of case frame 101 below the display 111.

According to the present invention, it is realized that the dome key unit and the touch sensor regions are arranged on the substrate together. But, this does not intend to limit the scope and spirit of the present invention. That is, it may be installed to realize the touch sensor under a window extending from the display of the electronic device such that the touch sensor is provided on the almost same layer of the substrate, and place the window into electrical contact with the substrate.

By arranging a metal dome installation region and a touch region on one substrate (layer) together, a key button assembly according to an exemplary embodiment of the present invention does not suffer destruction or malfunction despite long time operation, and makes contribution to the slimming of the electronic device, the cost reduction thereof, and the reliability ensuring thereof resulting from the minimization of the function button.

While the invention has been shown and described with reference to certain preferred embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof. Specifically, it should be noted that the movement intervals, drag angles, directions and movement interval units described herein are merely exemplary and may be varied in accordance with the spirit and scope of this invention.

What is claimed is:

1. An electronic device comprising: a key button assembly comprising:

a substrate having a key sensor region and a touch sensor region;

a dome key unit arranged on the key sensor region of the substrate;

a key button arranged above the dome key unit in alignment with the dome key unit; and a touch sensor arranged on the touch sensor region of the substrate and being arranged in alignment with a region overlapping with a part of the key button, wherein the key button performs at least two functions associated with different input schemes at the same input point of the key button by means of the dome key unit and the touch sensor, wherein the key button is installed in such a manner that a part of the key button is exposed to an exterior surface of a case frame of the electronic device, wherein the case frame is installed such that an inner surface of the case frame is retained in electrical contact with a plurality of touch sensor installation regions of the substrate, wherein a resilient contact pad is interposed between the key button and a metal dome, for transmitting smooth pressurization and restoration force on the metal dome, wherein the contact pad is formed of conductive rubber or conductive silicon materials, and wherein the contact pad is installed such that a bottom surface of the contact pad is retained in contact with the touch sensor region of the substrate.

2. The electronic device of claim 1, wherein the dome key unit comprises:

a 1st contact point arranged in a dome key unit installation region of the substrate;

a 2nd contact point arranged to be spaced apart and electrically insulated from the 1st contact point; and the metal dome installed to electrically connect with the 2nd contact point, and electrically connecting the 2nd contact point with the 1st contact point by actuation of the key button.

3. The electronic device of claim 1, wherein the case frame is formed of glass material.

4. The electronic device of claim 3, wherein the case frame is a touch sensitive surface extending from a display of the electronic device.

5. The electronic device of claim 1, wherein the electronic device is a mobile terminal.

6. An operating method of an electronic device for selectively driving a dome key unit sensor and a touch sensor installed in a substrate by one key button, the method comprising:

executing a 1st function by pressurizing the key button and activating the dome key unit sensor; and executing a 2nd function by touching the key button and activating the touch sensor, wherein the 1st function is executed on a preferential basis, wherein the key button is installed in such a manner that a part of the key button is exposed to an exterior surface of a case frame of the electronic device, wherein the case frame is installed such that an inner surface of the case frame is retained in electrical contact with a plurality of touch sensor installation regions of the substrate, wherein a resilient contact pad is interposed between the key button and a metal dome, for transmitting smooth pressurization and restoration force on the metal dome, wherein the contact pad is formed of conductive rubber or conductive silicon materials, and wherein the contact pad is installed such that a bottom surface of the contact pad is retained in contact with the touch sensor region of the substrate.

7. The method of claim 6, wherein the 1st function is a power on/off function of the electronic device or a sleep mode or wake-up mode conversion function of the electronic device.

8. The method of claim 7, wherein, when the dome key unit is pressurized longer than a predetermined time by pressurization of the key button, the power on/off function of the electronic device is activated.

9. The method of claim 7, wherein, when the dome key unit is pressurized shorter than a predetermined time, the sleep mode or wake-up mode conversion function of the electronic device is activated.

10. The method of claim 6, wherein the 2nd function is a home button function for restoring a currently displayed screen of the electronic device to a home screen.

11. A key button assembly for an electronic device, the assembly comprising:

a substrate having a key sensor region and a touch sensor region;

a dome key unit arranged on the key sensor region of the substrate;

a key button arranged above the dome key unit in alignment with the dome key unit, and installed to be partially exposed to a case frame of an electronic device; and a touch sensor arranged on the touch sensor region of the substrate and being arranged in alignment with a region overlapping with a part of the key button, wherein the key button performs at least two functions associated with different input schemes at the same input point of the key button by means of the dome key unit and the touch sensor, wherein the key button is installed in such a manner that a part of the key button is exposed to an exterior surface of a case frame of the electronic device, wherein the case frame is installed such that an inner surface of the case frame is retained in electrical contact with a plurality of touch sensor installation regions of the substrate, wherein a resilient contact pad is interposed between the key button and a metal dome, for transmitting smooth pressurization and restoration force on the metal dome, wherein the contact pad is formed of conductive rubber or conductive silicon materials, and wherein the contact pad is installed such that a bottom surface of the contact pad is retained in contact with the touch sensor region of the substrate.

12. The key button assembly of claim 11, wherein the dome key unit comprises:

a 1st contact point arranged in a dome key unit installation region of the substrate;

a 2nd contact point arranged to be spaced apart and electrically insulated from the 1st contact point; and the metal dome installed to electrically connect with the 2nd contact point, and electrically connecting the 2nd contact point with the 1st contact point by actuation of the key button.

13. The key button assembly of claim 11, wherein the case frame is formed of glass material used as a window of the electronic device,.

14. The key button assembly of claim 11, wherein the electronic device is a mobile terminal.

* * * * *